(12) United States Patent
Kato

(10) Patent No.: US 8,668,174 B2
(45) Date of Patent: Mar. 11, 2014

(54) FASTENER FOR ELONGATED COMPONENT

(75) Inventor: Hiroyuki Kato, Utsunomiya (JP)

(73) Assignee: Newfrey LLC, Newark, DE (US)

( * ) Notice: Subject to any disclaimer, the term of this patent is extended or adjusted under 35 U.S.C. 154(b) by 309 days.

(21) Appl. No.: 12/872,653

(22) Filed: Aug. 31, 2010

(65) Prior Publication Data

US 2011/0049312 A1 Mar. 3, 2011

(30) Foreign Application Priority Data

Aug. 31, 2009 (JP) ................. 2009-199586

(51) Int. Cl.
*F16L 3/08* (2006.01)
*F16L 3/22* (2006.01)
*B42F 13/00* (2006.01)
*F16M 13/00* (2006.01)

(52) U.S. Cl.
USPC ............. 248/74.2; 248/68.1; 24/339; 24/555

(58) Field of Classification Search
USPC ........ 248/74.2, 74.3, 74.4, 562, 580, 610, 63, 248/67.5, 68.1, 65, 71, 73; 24/339, 555
See application file for complete search history.

(56) References Cited

U.S. PATENT DOCUMENTS

| | | | | | |
|---|---|---|---|---|---|
| 3,921,261 | A | * | 11/1975 | Fisher | 24/580.1 |
| 4,566,660 | A | * | 1/1986 | Anscher et al. | 248/74.2 |
| 4,614,321 | A | * | 9/1986 | Andre | 248/74.2 |
| 4,618,114 | A | * | 10/1986 | McFarland | 248/65 |
| 4,840,333 | A | * | 6/1989 | Nakayama | 248/68.1 |
| 4,840,334 | A | * | 6/1989 | Kikuchi | 248/73 |
| 5,257,768 | A | * | 11/1993 | Juenemann et al. | 248/604 |
| 5,301,917 | A | * | 4/1994 | Dyer | 248/74.2 |
| 5,947,426 | A | * | 9/1999 | Kraus | 248/74.2 |
| D424,922 | S | * | 5/2000 | Sherman et al. | D8/395 |
| 6,105,216 | A | * | 8/2000 | Opperthauser | 24/459 |
| 6,152,406 | A | * | 11/2000 | Denndou | 248/68.1 |
| 6,309,134 | B1 | * | 10/2001 | Hann | 403/326 |
| 6,371,419 | B1 | * | 4/2002 | Ohnuki | 248/74.2 |
| 6,688,679 | B2 | * | 2/2004 | Droulez | 296/208 |
| 6,708,931 | B2 | * | 3/2004 | Miura | 248/68.1 |
| 6,923,407 | B2 | * | 8/2005 | Takeuchi | 248/73 |
| 7,011,277 | B2 | * | 3/2006 | Mizukoshi et al. | 248/68.1 |

(Continued)

FOREIGN PATENT DOCUMENTS

| | | |
|---|---|---|
| JP | 10-246209 A | 9/1998 |
| JP | 11-336717 A | 12/1999 |

(Continued)

*Primary Examiner* — Jonathan Liu
*Assistant Examiner* — Chiedu Chibogu
(74) *Attorney, Agent, or Firm* — Michael P. Leary

(57) ABSTRACT

A fastener for securing pipes or wire bundles to a foundation structure includes a body and a separate pipe or wire clamp. The body has a clamp holder for receiving and holding the clamp. The clamp holder receives the clamp with a gap allowing the clamp to vibrate. Leaf springs are formed on the side walls of the clamp holder to resiliently support the side wall of the clamp within the clamp holder. Second leaf springs with anti-release pawls are formed on the bottom of the clamp, and second leaf spring receiving grooves are formed in the bottom of the clamp holder to resiliently engage the second leaf springs and anti-release pawls. Third leaf springs are formed on the bottom of the clamp, and third leaf spring receiving grooves are formed on the bottom of the clamp holder to resiliently engage the third leaf springs.

9 Claims, 11 Drawing Sheets

(56) References Cited

U.S. PATENT DOCUMENTS

| | | | |
|---|---|---|---|
| 7,064,274 B2* | 6/2006 | O'Connor | 174/74 A |
| 7,172,162 B2* | 2/2007 | Mizukoshi et al. | 248/68.1 |
| 7,240,810 B2* | 7/2007 | Harrity et al. | 222/464.4 |
| 7,278,190 B2* | 10/2007 | Fischer et al. | 24/530 |
| 7,784,745 B2* | 8/2010 | Dodge | 248/73 |
| D631,739 S* | 2/2011 | Craig et al. | D8/396 |
| 8,356,778 B2* | 1/2013 | Birli et al. | 248/73 |
| 2003/0136884 A1* | 7/2003 | Miura | 248/68.1 |
| 2003/0213876 A1* | 11/2003 | Takeuchi | 248/71 |
| 2004/0007648 A1* | 1/2004 | Miura et al. | 248/71 |
| 2004/0065785 A1* | 4/2004 | Miura et al. | 248/62 |
| 2005/0127248 A1* | 6/2005 | Suzuki et al. | 248/68.1 |
| 2006/0249634 A1* | 11/2006 | Van Walraven | 248/71 |
| 2007/0246614 A1* | 10/2007 | Allmann et al. | 248/65 |
| 2008/0048072 A1* | 2/2008 | Mizukoshi | 248/65 |
| 2009/0166489 A1* | 7/2009 | Volchko | 248/205.1 |
| 2012/0153095 A1* | 6/2012 | Child et al. | 248/68.1 |

FOREIGN PATENT DOCUMENTS

| | | |
|---|---|---|
| JP | 2000-230674 A | 8/2000 |
| JP | 2001-343006 A | 12/2001 |
| JP | 2008-075785 A | 4/2008 |

* cited by examiner

FASTENER FOR ELONGATED COMPONENT

CROSS-REFERENCE TO RELATED APPLICATIONS

This application claims the benefit of Japanese Application No. 2009-199586 filed Aug. 31, 2009, the disclosure of which is incorporated herein by reference.

BACKGROUND OF THE INVENTION

The present invention relates to a fastener for an elongated component comprising a clamp for holding an elongated component such as a pipe or wire harness and a body secured to an attachment component such as a body panel, in which the elongated component is attached to the attachment component by holding the elongated component in the clamp and by securing the body to the attachment component.

Fasteners for elongated components comprising a clamp for holding an elongated component such as a pipe or wire harness and a body secured to an attachment component such as a body panel, in which the elongated component is attached to the attachment component by holding the elongated component in the clamp and by securing the body to the attachment component, are well known in the art. When an elongated component such as a pipe is fastened to an attachment component such as a body panel, preventing the transmission of vibrations from the pipe to the body panel and preventing transmission of vibrations from the body panel to the pipe are desired. The most commonly used anti-vibration means is a resilient soft material such as rubber. This is attached to the bottom surface of the clamp receiving the pipe to reduce the transmission of vibrations.

Prior art patent documents include:
[Patent Document 1] Japanese Published Unexamined Patent Application No. 10-246209
[Patent Document 2] Japanese Published Unexamined Patent Application No. 11-336717
[Patent Document 3] Japanese Published Unexamined Patent Application No. 2001-343006
[Patent Document 4] Japanese Published Unexamined Patent Application No. 2000-230674
[Patent Document 5] Japanese Published Unexamined Patent Application No. 2008-075785

Japanese Published Unexamined Patent Applications No. 10-246209, No. 11-336717, and No. 2001-343006 describe fasteners for elongated components in which an anti-vibration material made of a resilient soft material such as an elastomer or rubber is applied to reduce the transmission of vibrations. The requirement of an anti-vibration material such as a resilient soft material is a disadvantage in these fasteners. It places restrictions on the molding process and, when the elongated component is inserted into the clamp, the frictional resistance of the resilient elastic material is great and so a large amount of force is required to get the clamp to hold the elongated component. Also, the anti-vibration material sometimes ruptures during the holding operation.

Japanese Published Unexamined Patent Application No. 2000-230674 describes a fastener in which one of a plurality of clamps is molded in two colors and a soft material is interposed between the integrally molded hard material of the clamp and the hard material of the body, the soft material serving as the anti-vibration material for reducing the transmission of vibrations. In this fastener, the need for a soft material as the anti-vibration material is also a disadvantage. Because two color molding is also required, the molding process is more expensive and time-consuming. A clamp without a soft material is also installed in the fastener, and the pipe is held by a pair of leaf springs at the bottom of the clamp. However, because the leaf springs on the bottom of the clamp are integrally molded with the body, vibrations from the leaf springs are transmitted to the body. In other words, it does not have a vibration absorbing effect.

The holder for an elongated component described in Japanese Published Unexamined Patent Application No. 2008-075785 has a configuration in which the transmission of vibrations is prevented without requiring a resilient soft material such as rubber in the clamp. In this fastener, the plurality of clamps has thin portions connected to the body, and the deflection of the thin portions inhibits the transmission of vibrations. Because the fastener is connected to the body via thin portions, strong vibrations cannot be absorbed, and the connection between the clamp and the body is not very strong. In other words, it is disadvantageous in terms of a reliable and permanent connection between an elongated component such as a pipe and an attachment component such as a body panel.

BRIEF SUMMARY OF THE INVENTION

Therefore, the purpose of the present invention is to provide a fastener for an elongated component that is able to prevent the propagation of vibrations from a pipe without the use of a soft material, that is able to allow for easy insertion of the pipe, and that is able to facilitate easy assembly of subcomponents.

In order to achieve this purpose, the present invention is a fastener for an elongated component comprising a clamp for holding an elongated component such as a pipe or wire harness and a body secured to an attachment component such as a body panel, wherein the elongated component is attached to the attachment component by holding the elongated component in the clamp and by securing the body to the attachment component, wherein the clamp is formed as a separate component from the body, wherein the body has a securing portion fixed to the attachment component and a clamp holder for receiving and holding the clamp, wherein the clamp is formed in a U-shape with side walls and a bottom for receiving the elongated component pushed in from the open end, and a resilient holding plate extends towards the bottom to hold the elongated component received in the open end in the clamp, wherein the clamp holder in the body is formed from side walls and a bottom forming a space for receiving the clamp while retaining a gap in which the clamp is able to vibrate with respect to the clamp holder, wherein a first leaf spring means is formed in the side wall of the clamp holder to resiliently press against the side wall of the clamp so as to maintain a gap allowing the clamp to vibrate with respect to the clamp holder between the side wall of the clamp and the side wall of the clamp holder when the clamp has been received by the clamp holder, wherein a connecting means is formed in the bottom of the clamp and the bottom of the clamp holder to connect the clamp to the clamp holder when the clamp has been pushed into the clamp holder, the connecting means comprising an anti-release pawl means formed in the bottom of the clamp and an anti-release protrusion formed in the bottom of the clamp holder, and wherein a second leaf spring means is formed in the anti-release pawl means to resiliently press against the anti-release protrusion so as to maintain a gap between the bottom of the clamp and the bottom of the clamp holder allowing the clamp to vibrate with respect to the clamp holder.

The first leaf springs and second leaf springs maintain a gap that allows the clamp to vibrate with respect to the clamp holder. As a result, the transmission of vibrations is reduced or prevented (absorbed) within the gap even whether the clamp vibrates with respect to the clamp holder or the clamp holder vibrates with respect to the clamp. In other words, a holder for an elongated component is provided in which a soft material is not used to prevent the transmission of vibrations between an elongated component such as a pipe and an attachment component such as a body panel, in which the elongated component can be easily inserted, in which components made of a soft material are not required, and in which assembly is easy.

In this fastener, a first leaf spring receiving groove is formed in the side wall of the clamp to resiliently engage the first leaf spring, and a protrusion is formed in the middle of the first leaf spring to make contact with the middle of the first leaf spring receiving groove, the first leaf spring receiving groove is formed so as to be deep in the middle and become gradually shallower at both ends, and the resiliency of the first leaf spring changes and the vibration is reduced or absorbed in the gap when the clamp vibrates in the clamp holder. This further improves the vibration transmission reducing or preventing effect. In this fastener, a pair of first leaf springs is formed in the pair of side walls of the clamp holder, the first leaf springs have a slender leaf shape extending in the middle of the side wall of the clamp holder from the open end to the bottom of the side wall near both edges of the side wall of the clamp holder lengthwise with respect to the elongated component, and first leaf spring receiving grooves are formed in the clamp at positions corresponding to the first leaf springs. This further improves the vibration transmission reducing or preventing effect.

In this fastener, the anti-release pawl means and the second leaf spring means are integrally formed as second leaf springs with anti-release pawls, curved second leaf spring receiving grooves are formed in the anti-release protrusions for resiliently engaging the tips of the second leaf springs with anti-release pawls riding over the anti-release protrusions, and the curved shape of the second leaf spring receiving grooves allows the resiliency of the second leaf springs with anti-release pawls to change and the vibration to be reduced or absorbed in the gap when the clamp vibrates in the clamp holder. This further improves the vibration transmission reducing or preventing effect. In this fastener, anti-release protrusions are formed in the pair of side walls in the clamp holder near the bottom of the clamp holder, and the second leaf springs with anti-release pawls are formed in the clamp holder at positions corresponding to the anti-release protrusions. This further improves the vibration transmission reducing or preventing effect. In this fastener, the curved shape of the second leaf spring receiving grooves increases the deflection of the second leaf springs with anti-release pawls when the surface engaging the tips of the second leaf springs with anti-release pawls is subjected to force moving the elongated component in the clamp out of the clamp in the release direction. This strengthens the restraints keeping the clamp from moving and coming out of the clamp holder.

In this holder, a third leaf spring is formed in the bottom of the clamp at a position other than the second leaf spring means, a third leaf spring receiving groove is formed in the bottom of the clamp holder to resiliently engage the third leaf spring, the third leaf spring receiving groove is formed with a curved shape to receive the third leaf spring, the curved shape is sloped so as to be deep in the middle and to become gradually shallower at both ends circumferentially and sloped so as to be deep in the inside and to become gradually shallower on the outside lengthwise with respect to the elongated component, the resiliency being smaller when the third leaf spring is along the middle of the third leaf spring receiving groove and the resiliency being larger when the third leaf spring is outside of the middle of the third leaf spring receiving groove, and movement is allowed so as to reduce or absorb the vibration in the gap when the clamp vibrates in the clamp holder. This further improves the vibration transmission reducing or preventing effect. In this holder, third leaf spring receiving grooves are formed at both edges in the bottom of the clamp holder lengthwise with respect to the elongated component, and a pair of third leaf springs is formed at both edges in the bottom of the clamp corresponding to the pair of third leaf spring receiving grooves and resiliently engaging the receiving grooves. This further improves the vibration transmission reducing or preventing effect.

DETAILED DESCRIPTION OF THE PREFERRED EMBODIMENT

The following is an explanation with reference to the figures of the fastener for an elongated component 1 in the first embodiment of the present invention. The fastener 1 consists of the body 2 shown in FIG. 1 through FIG. 5 and the clamp 3 shown in FIG. 6 through FIG. 9, which is separate from the body 2. As shown in FIG. 10 through FIG. 17, the clamp 3 is connected to the body 2. The body 2 and the clamp 3 are molded as separate components, but both components are integrally molded from a hard synthetic resin material. In the embodiment shown in the figures, clamps A, B and C common in the art are integrally molded in the body 2 to hold pipes separate from the pipe held by the clamp 3. Clamps A through C may or may not be used, but any other pipes are held parallel to the pipe held by the clamp 3.

Figure 18:
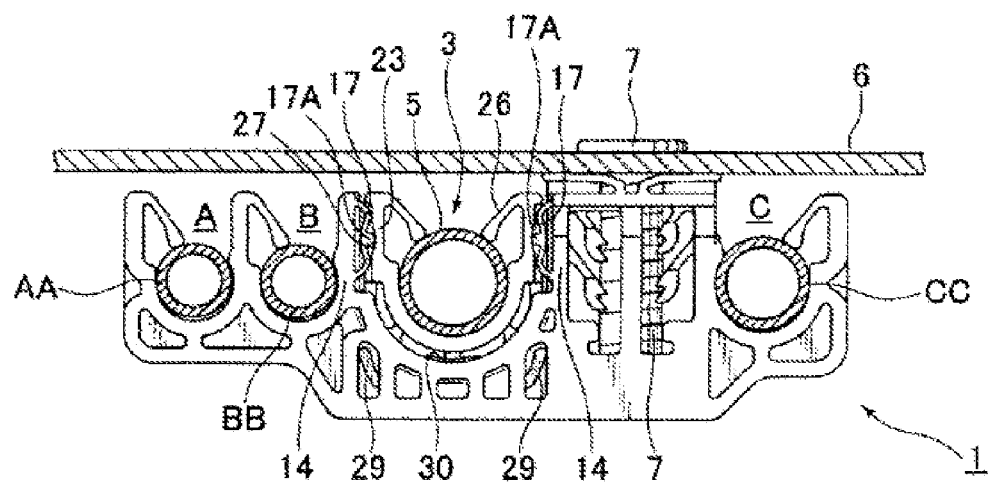
FIG. 18 is a front view of the fastener for an elongated component in the first embodiment of the present invention used to attach a pipe (elongated component) to a body panel (attachment component).

In the fastener 1, as shown in FIG. 18, the pipe 5 serving as the elongated component (as well as the other pipes AA, BB, CC) are held by the clamp 3 (as well as clamps A, B, C), and the body 2 is attached to a stud 7 standing upright on the body panel 6 serving as the attachment component. The fastener 1 is thus used to attach the pipe 5 (as well as pipes AA-CC) to the body panel 6. The clamp 3 in the fastener 1 of the present invention is received by the clamp holder 10 in the body 2 while maintaining a gap large enough to allow for vibration within a given range inside the clamp holder 10, and the clamp 3 and the clamp holder 10 are maintained dynamically within the range of this gap by the leaf springs (17, 29, 30) and the grooves for receiving the leaf springs (27, 18A, 21). Therefore, the clamp 3 can vibrate within the gap inside the clamp holder 10 in the body 2 due to the resiliency of the leaf springs, and the clamp 3 is held in the clamp holder 10 so that transmission of vibrations to the body 2 is reduced. The fastener 1 does not use a resilient soft material to prevent or dampen vibrations between the pipe 5 and the body panel 6. Vibrations can occur between the clamp 3 and the clamp holder 10 in the body 2, but transmission of vibrations from the pipe 5 to the body panel 6 can be reduced and the impact from the vibrations absorbed. In this embodiment, as shown in FIG. 18, a stud 7 with threaded grooves or circumferential grooves in the shaft portion stands erect on the body panel 6 for securing the securing portion of the body 2 to the stud 7.

The following is a detailed explanation of the body 2 with reference to FIG. 1 through FIG. 5. The body 2 has a securing portion 9 secured to the attachment component, a clamp holder 10 for receiving and holding the clamp 3, and conventional integrally molded clamps A, B, C. The securing portion 9 has a hollow center for receiving a shaft-like stud 7 standing erect on the body panel 6. The hollow portion has a plurality of pawls 11 for resiliently engaging the stud engagement portion of the stud 7 consisting of threaded grooves (in the case of a screw stud) or circumferential grooves (in the case of a circumferential groove stud). The top portion has an opening 13 through which the stud 7 can pass. The securing portion 9 in the example shown in the figures is configured so as to engage the stud 7. However, the securing portion 9 can be configured to engage a T stud or have an anchor-shaped clip inserted into and secured to a hole formed in the body panel 6. Any other securing means can also be used.

Figure 1:
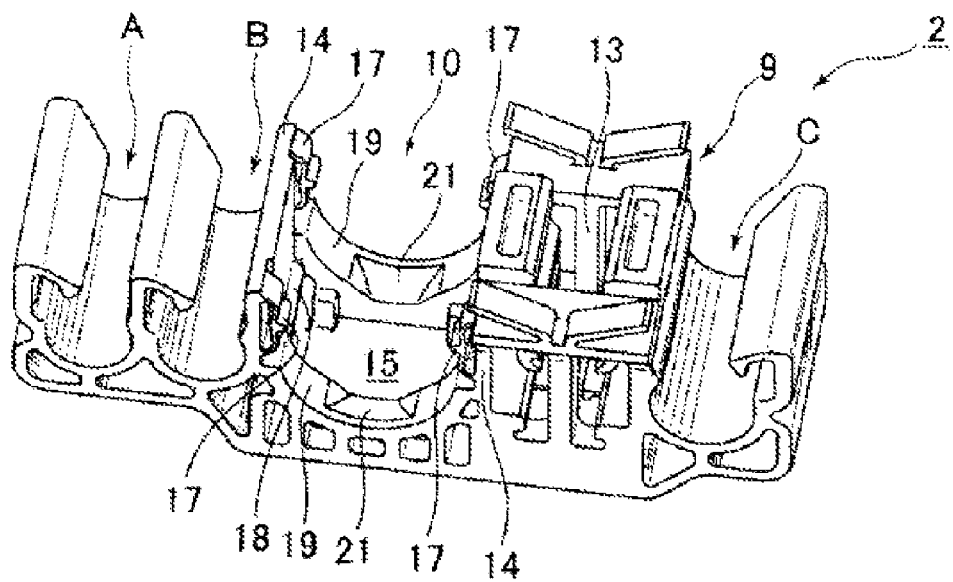
FIG. 1 is a perspective view of the body of the fastener for an elongated component in the first embodiment of the present invention.
Figure 2:
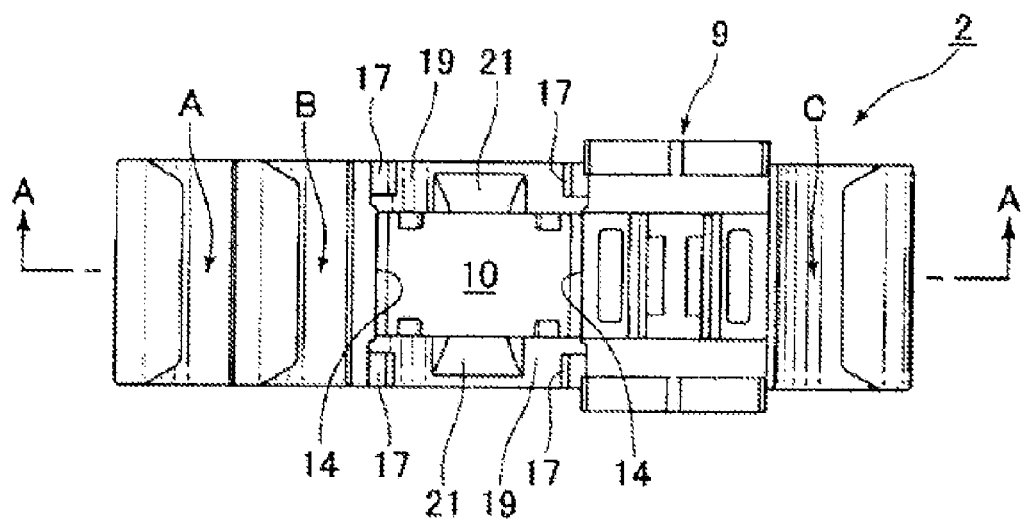
FIG. 2 is a top view of the body in FIG. 1.

The clamp holder 10 in the body 2 receives and holds a clamp 3 holding a pipe so that the clamp can vibrate transversely with respect to the axial line of the pipe. The clamp holder 10 has a pair of side walls 14 and a bottom 15 forming a space for receiving the clamp 3 with enough of a gap to allow the clamp 3 to vibrate with respect to the clamp holder 10. First leaf springs 17 are formed in the pair of clamp holder side walls 14 to resiliently press against the side walls of the clamp so as to maintain a gap between the side walls of the clamp and the side walls 14 of the clamp holder while receiving the clamp 3 in the clamp holder 10. A pair of first leaf springs 17 is formed in the side walls 14 of the clamp holder. The first leaf springs 17 have a slender leaf shape and extend from a high position corresponding to the open end 22 of the clamp 3 at the upper end of the walls towards the bottom 15 as far as the middle of the side walls 14 near both edges of the side walls 14 (lengthwise with respect to the pipes). The first leaf springs 17 extend radially inward from the side walls 14 towards the inside, and include protrusions 17A for elastically pressing against the side walls of the clamp 3 and which are formed in the middle lengthwise. The protrusions 17A press against the side walls of the clamp 3 at a point or along a short line and maintain a small contact area with the clamp 3. The protrusions 17A on the first leaf springs 17 are received by first leaf spring receiving grooves 27 in the side walls 23 of the clamp 3, and change the amount of resiliency in the first leaf springs 17 along the slope of the receiving grooves 27. As shown in FIG. 1, a pair of first leaf springs 17 is formed in the two side walls 14 for a total of four. The resiliency of the first leaf springs 17 maintains the clamp 3 received and held by the clamp holder 10 while maintaining a gap a fixed distance from the body 2. This can reduce or absorb within the gap the force of the clamp 3 moving parallel to the side walls 14 (force moving in the left and right directions), can reduce or absorb within the gap force from the clamp 3 moving around the axis of the pipe (force in the rotational direction) in the front view shown in FIG. 3, and can reduce or absorb within the gap force moving up or down in FIG. 3 along with the first leaf spring receiving grooves 27 explained below (force in the rotational direction). This prevents transmission of vibrations between an elongated component such as a pipe and an attachment component such as a body panel without using a soft material, allows for easy insertion of the elongated component, and does not require components made out of a soft material.

Figure 3:
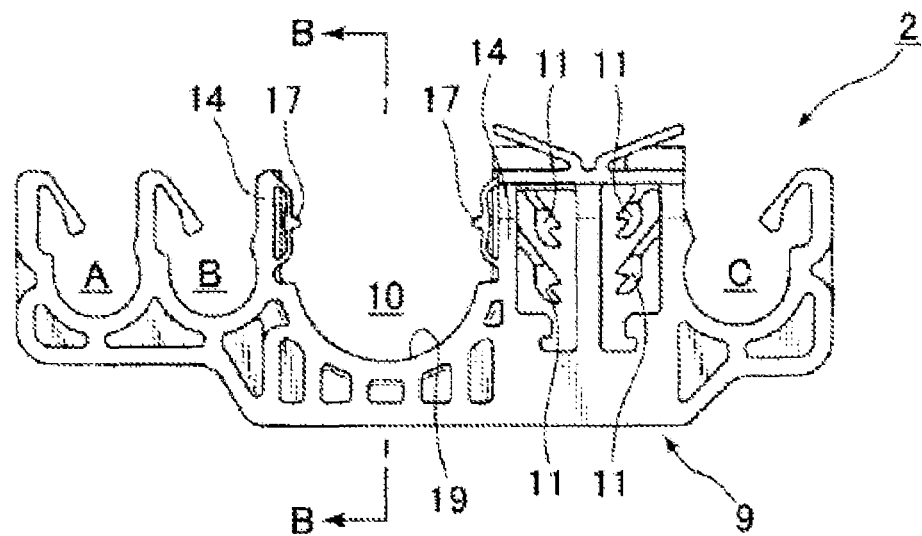
FIG. 3 is a front view of the body in FIG. 2.
Figure 4:
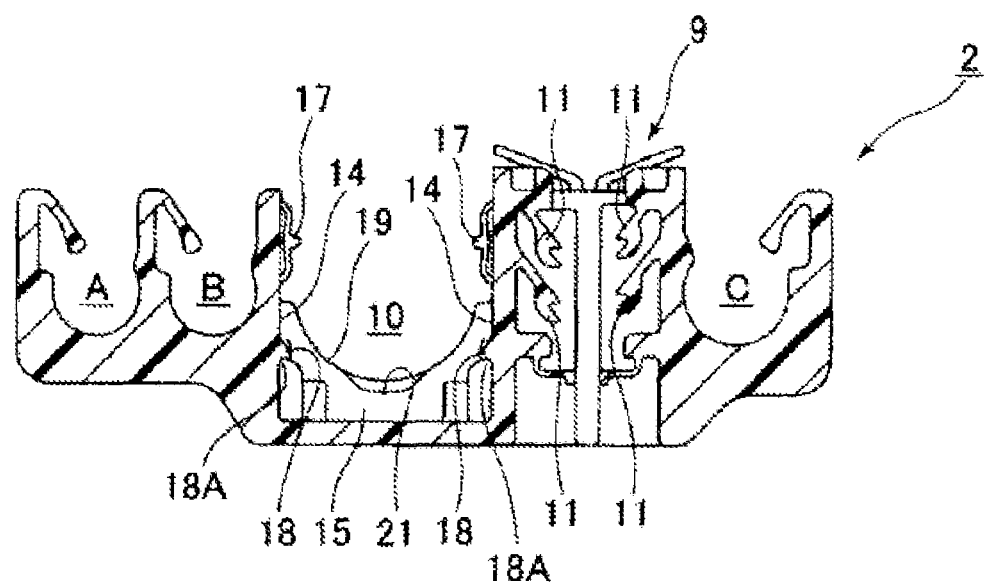
FIG. 4 is a vertical cross-sectional view of the body from A-A in FIG. 2.
Figure 5:
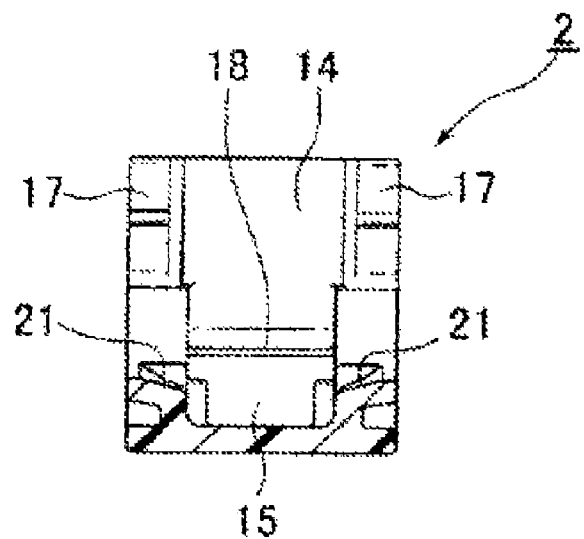
FIG. 5 is a vertical cross-sectional view of the body from B-B in FIG. 3.

Another connecting means is formed in the side wall 14 of the clamp holder 10 in the body 2 near the bottom 15 in order to connect the clamp 3 to the clamp holder 10 by inserting the clamp 3 into the clamp holder 10. This second connecting means includes anti-release protrusions 18 formed in the side walls 14 near the bottom 15. The anti-release protrusions 18, as shown most clearly in FIG. 4 and FIG. 5, engage second leaf springs with anti-release pawls 29 formed in the bottom of the clamp 3 to keep the clamp 3 from being released from the clamp holder 10. The anti-release protrusions 18 have a gentle slope in the upper portion on the side wall 14 end in order to easily receive the second leaf springs with anti-release pawls 29 formed in the bottom 25 of the clamp 3 and to reliably prevent release after reception. Anti-release protrusions 18 also have an under surface facing the bottom 15 with a recess to facilitate the same operations. The portion with the under surface forms a second leaf spring receiving groove 18A for receiving a second leaf spring with anti-release pawls 29 in the clamp 3. As shown in FIG. 4, the second leaf spring receiving grooves 18A are formed with a curve sloping upward for receiving the tip of the second leaf springs with anti-release pawls 29, changing the resiliency of the leaf springs in response to changes in the posture of the second leaf springs (with anti-release pawls) 29, reducing or absorbing within the gap the force of the clamp 3 moving parallel to the side walls 14 (force moving in the left and right directions), and reducing or absorbing within the gap force from the clamp 3 moving around the axis of the pipe (force in the rotational direction) in the front view shown in FIG. 3. This prevents transmission of vibrations between an elongated component such as a pipe and an attachment component such as a body panel without using a soft material, allows for easy insertion of the elongated component, and does not require components made out of a soft material.

Curved holders 19 are formed along both front and back edges of the bottom 15 lengthwise with respect to the pipe 5 and have a shape conforming to the bottom surface 25 of the clamp 3 so that the clamp 3 can rotate slightly in the axial direction of the pipe (within the range of the gap) on the bottom 15. Third leaf spring receiving grooves 21 are formed in the holders 10 for receiving the third leaf springs 30 formed on the bottom surface 25 of the clamp 3. The third leaf spring receiving groove 21 is formed in a curved shape to receive the third leaf springs 30 formed in the bottom of the clamp 3, and the groove 21 is formed at a slope so that it is deep in the middle and gradually becomes shallower at both ends circumferentially. Third leaf spring retaining groove 21 is also formed at a slope so as to be deeper on the inside and gradually shallower on the outside lengthwise with respect to the pipe. When the third leaf springs 30 on the clamp 3 are in the middle of the third leaf spring receiving grooves 21, the resiliency of the leaf spring is smaller. When the leaf spring is outside of the middle, the resiliency is greater. Thus, when the clamp 3 vibrates inside the clamp holder 10, the resiliency of the third leaf springs 30 changes, and the vibration between the clamp 3 and the clamp holder 10 is reduced or absorbed in the gap. This further improves the vibration transmission reducing and eliminating effect.

The following is a detailed description of the clamp 3 with reference to FIG. 6 through FIG. 9. The clamp 3 holds an elongated component such as a pipe 5. The clamp 3 is also held in a clamp holder 10 on the body 2 while maintaining a gap and is moveable within the gap. The clamp 3 is U-shaped for receiving a pipe pushed in from the open end 22 at the top and comprises a pair of side walls 23 extending vertically and parallel to each other, and a bottom wall 25 curving from the bottom ends of the side walls 23 to hold the bottom of the pipe securely. Resilient holding plates 26 for holding the received pipe in the clamp 3 extend from the top end of the side walls 23 at a slope towards the bottom 25. In the example shown in FIGS. 6-7, there is a pair of resilient holding plates 26. Preferably, a pair of resilient holding plates 26 is formed to hold the pipe in a balanced manner. However, a single plate is enough to hold the pipe. The clamp 3 is received and held by the clamp holder 10 with a gap large enough to allow the clamp 3 to vibrate with respect to the clamp holder 10. The gap is maintained at a size that allows the clamp 3 to vibrate, and this includes a first assembly consisting of first leaf springs 17 on the clamp holder 10 and first leaf spring receiving grooves 27 formed on the outer surface of the side walls 23 of the clamp 3, a second assembly consisting of second leaf springs with anti-release pawls 29 formed on the bottom 25 of the clamp 3 and second leaf spring receiving grooves 18A formed adjacent to the anti-release protrusions 18 on the clamp holder 10, and a third assembly consisting of third leaf springs 30 formed on the bottom 25 of the clamp 3 and third leaf spring receiving grooves 21 formed in the bottom 15 of the clamp holder 10.

Figure 6:
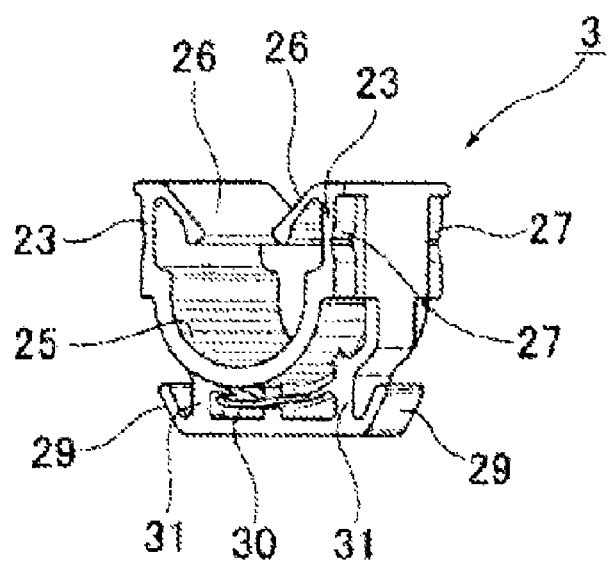
FIG. 6 is a perspective view of the clamp in the body of the fastener for an elongated component in the first embodiment of the present invention.
Figure 7:
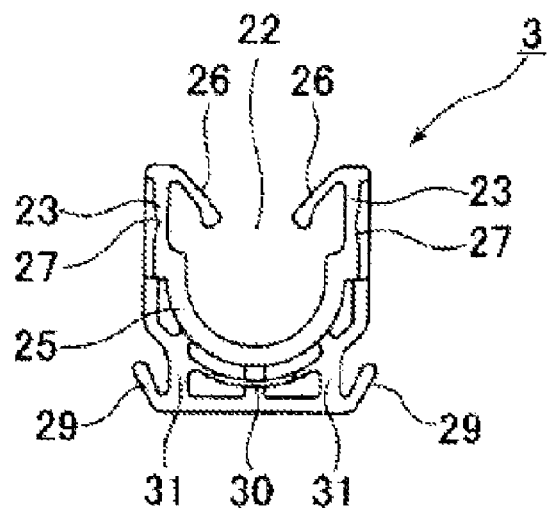
FIG. 7 is a front view of the clamp in FIG. 6.
Figure 8:
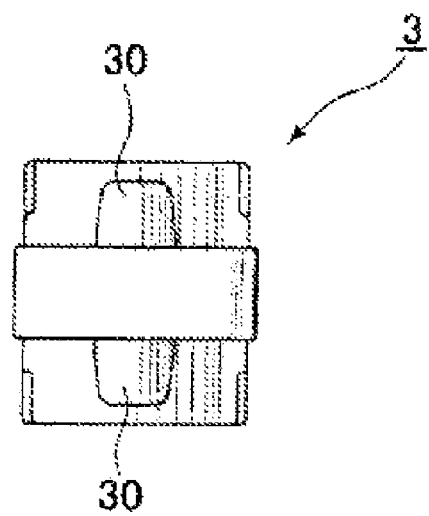
FIG. 8 is a bottom view of the clamp in FIG. 7.
Figure 9:
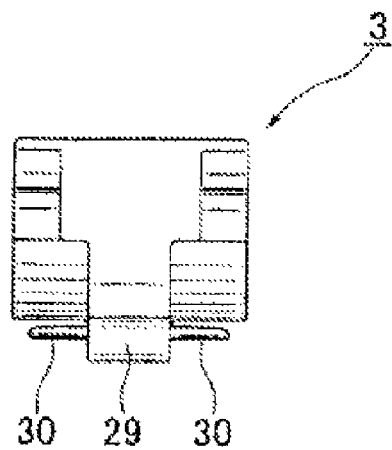
FIG. 9 is a side view of the clamp in FIG. 7.
Figure 10:
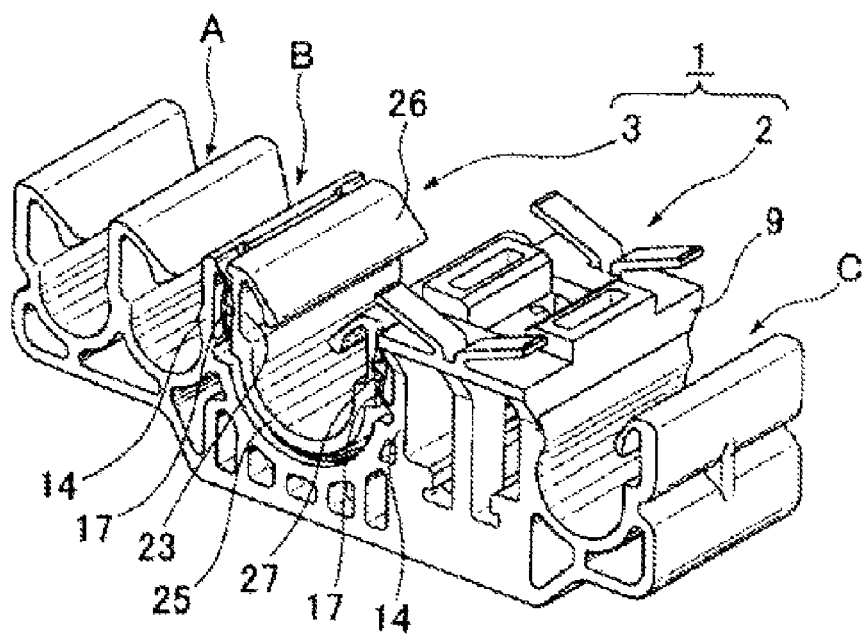
FIG. 10 is a perspective view of the fastener for an elongated component in the first embodiment of the present invention.
Figure 11:
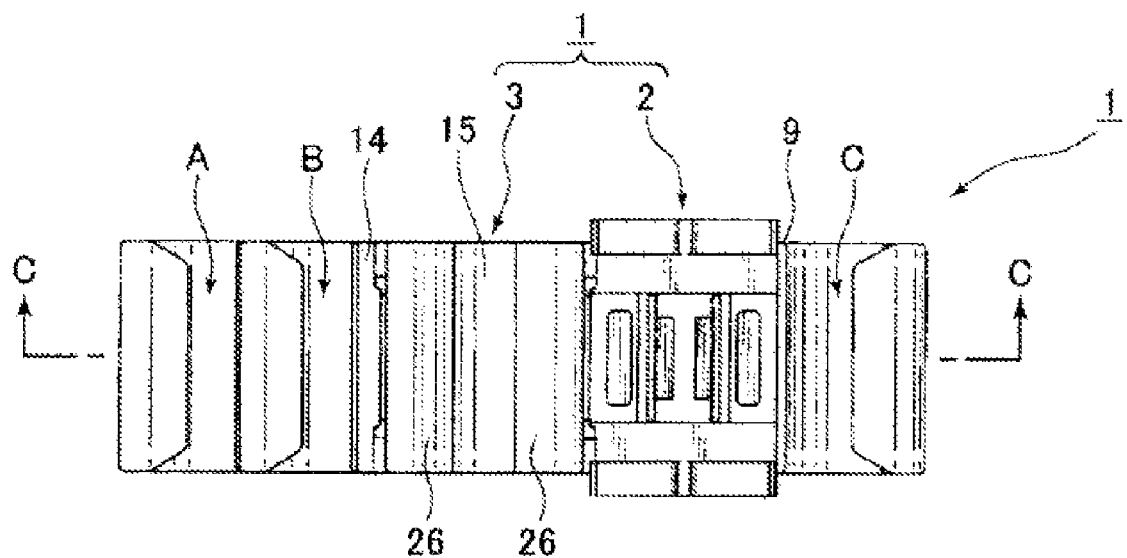
FIG. 11 is a top view of the fastener in FIG. 10.
Figure 12:
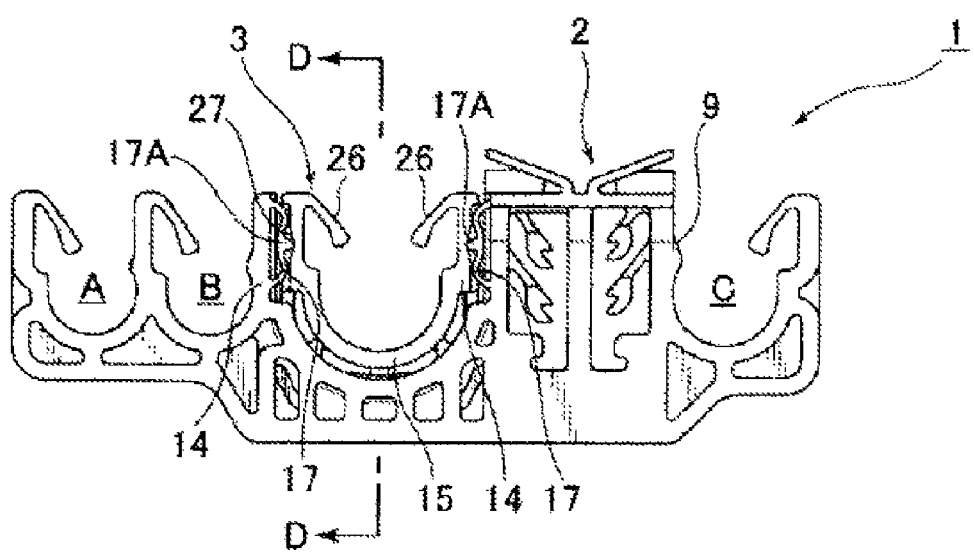
FIG. 12 is a front view of the fastener in FIG. 11.
Figure 13:
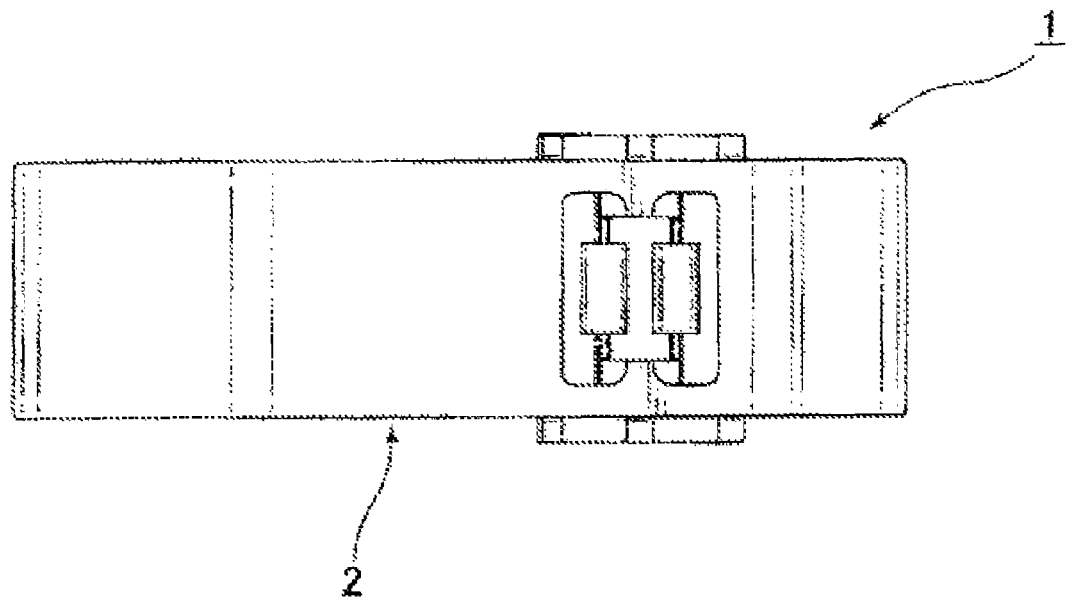
FIG. 13 is a bottom view of the fastener in FIG. 12.
Figure 14:
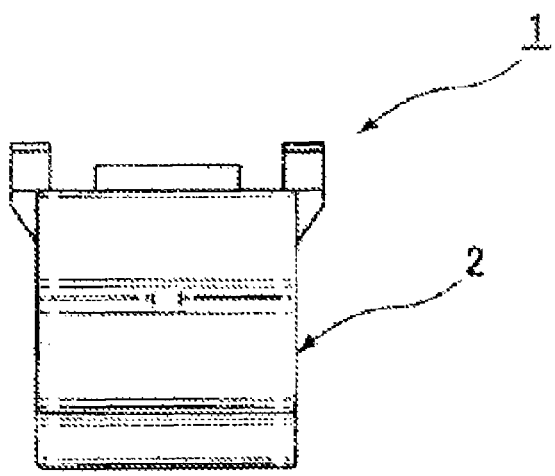
FIG. 14 is a left side view of the fastener in FIG. 12.
Figure 15:
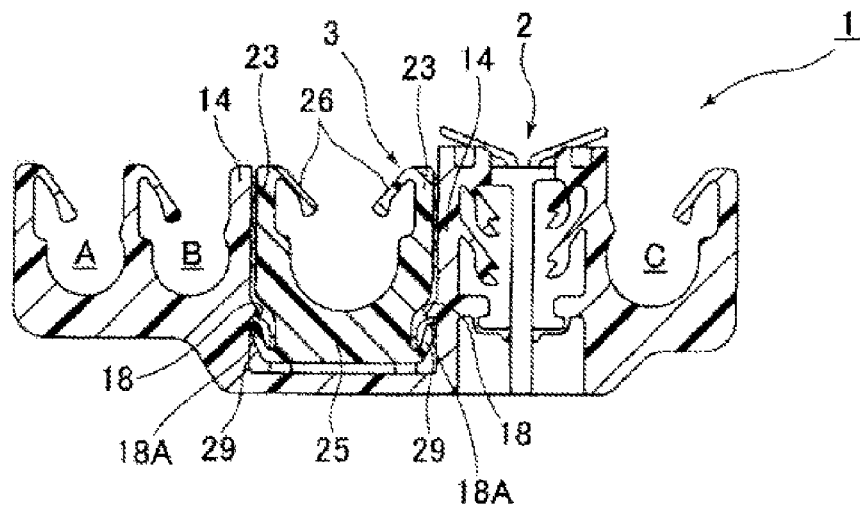
FIG. 15 is a cross-sectional view of the fastener from C-C in FIG. 11.
Figure 16:
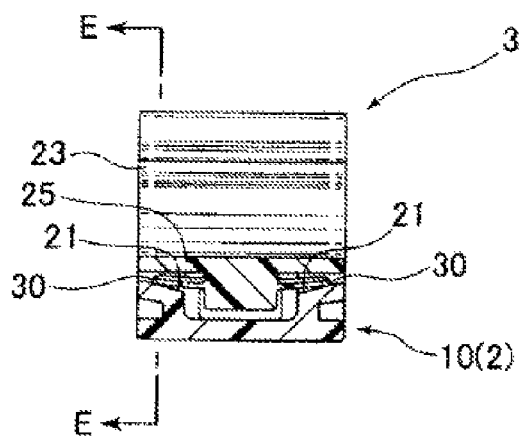
FIG. 16 is a cross-sectional view of the fastener from D-D in FIG. 12.
Figure 17:
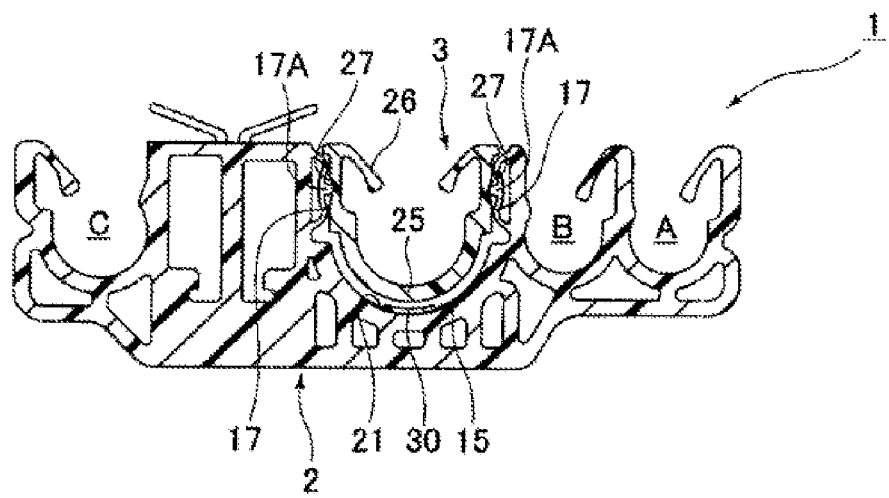
FIG. 17 is a cross-sectional view of the fastener from E-E in FIG. 16.

Four first leaf spring receiving grooves 27 are formed along both edges of the outer surface of the side walls 23 of the clamp 3 lengthwise with respect to the pipe on the side walls 23 in positions to receive the first leaf springs 17 on the clamp holder 10 and engage the first leaf springs 17. The first leaf spring receiving grooves 27 are formed so as to be deep in the middle vertically and to become gradually shallower as they move upward and downward as shown in FIG. 6 and FIG. 7. This allows them to receive the first leaf springs 17. When the protrusion 17A on a first leaf spring 17 is received in the middle of a first leaf spring receiving groove 27, constant resiliency is applied to the clamp 3. If the protrusions 17A on the four first leaf springs 17 are in the middle of the first leaf spring receiving grooves 27, the first leaf springs 17 press the clamp 3 in towards the clamp holder 10 in a balanced manner and the clamp 3 is held inside the clamp holder 10 while maintaining a uniform gap. When vibrations in the pipe cause it to lean against the clamp 3, the protrusions 17A leave the middle of the first leaf spring receiving grooves 27 and move along the sloped surface. The protrusions 17A become deflected outward from the sloped surface, and this increases the amount of resiliency in the first leaf springs 17. As shown in FIG. 1, a pair of first leaf springs 17 is formed in both two side walls 14 for a total of four. The resiliency of the first leaf springs 17 holds the received clamp 3 in the clamp holder 10 while maintaining a constant gap with respect to the body 2. When the clamp 3 holding a pipe moves (or leans) with respect to the clamp holder 10 due to vibrations in the pipe, the first leaf springs 17 change the resiliency from the first leaf spring receiving grooves 27. As a result, force of the clamp 3 moving parallel to the side walls 14 (the force in the left and right directions) is absorbed within the gap. Force from the clamp 3 moving around the axis of the pipe (force in the rotational direction) in the front view shown in FIG. 3 is also absorbed within the gap. In addition, force moving up or down in FIG. 3 along the sloped surface 27A of the first leaf spring receiving grooves 27 (force in the rotational direction) is absorbed in the gap. As a result, the transmission of vibrations from the pipe (or the body panel to which the body is secured) can be reduced or blocked between the clamp holder 10 and the clamp 3.

A pair of second leaf springs with anti-release pawls 29 are formed on the bottom 25 of clamp 3 to engage anti-release protrusions 18 on the clamp holder 1. In the embodiment shown in FIGS. 6-7, the second leaf springs with anti-release pawls 29 are a pair of resilient engagement plates formed from the frame 31 which extends downward from the lower portion of the bottom 25. As shown in FIG. 6 and FIG. 7, second leaf springs 29 expand upward and outward from the frame 31. The second leaf springs with anti-release pawls 29 are resilient so that they deflect inward, easily ride over the anti-release protrusions 18 and spring back outward to engage the second leaf spring receiving grooves 18A. The second leaf springs with anti-release pawls 29 act as anti-release pawls preventing release after the clamp 3 has been received by the clamp holder 10. The second leaf springs with anti-release pawls 29 extend lengthwise with respect to the pipe in order to maintain high anti-release strength. The second leaf springs with anti-release pawls 29 also resiliently engage the second leaf spring receiving grooves 18A, and the resiliency from the spring action acts to hold the clamp 3 in the clamp holder 10 while maintaining a gap. More specifically, the tips of the second leaf spring with anti-release pawls 29 resiliently engage the second leaf spring receiving grooves 18A and the resiliency of the spring action absorbs within the gap the force of the clamp 3 moving parallel to the side walls 14 (force moving left and right), absorbs within the gap force from the clamp 3 moving around the axis of the pipe in the front view in FIG. 3 (force in the rotational direction), and blocks or reduces the transmission of vibrations from the pipe (or the body panel to which the body is secured) between the clamp holder 10 and the clamp 3.

The third leaf springs 30 are formed to resiliently engage the third leaf spring receiving grooves 21 formed in the bottom 15 of the clamp holder 10. The pair of third leaf springs 30 is formed to correspond to the third leaf spring receiving grooves 21 on the pair of holders 19 formed at both edges on the curved bottom 15 of the clamp holder 10 in order to resiliently engage the receiving grooves 21. The third leaf springs 30 receive the third leaf spring receiving grooves 21 and elastically engage the receiving grooves. As a result, the resiliency of the third leaf springs acts to push the clamp 3 up against the clamp holder 10 and absorb force from the pipe moving downward in FIG. 3. As previously mentioned, the third leaf spring receiving grooves 21 are formed at a slope so that they are deep in the middle and gradually become shallower at both ends circumferentially. They are also formed at a slope so as to be deeper on the inside of the clamp 3 and gradually shallower on the outside lengthwise with respect to the pipe. When the third leaf springs 30 on the clamp 3 are in the middle of the third leaf spring receiving grooves 21, the resiliency of the leaf springs is smaller. When the leaf springs are outside of the middle, the resiliency is greater. This absorbs within the gap force from the clamp moving around the axis of the pipe in the front views of FIG. 3 and FIG. 7 (force in the rotational direction). In order to further improve the resiliency changing effect, as shown in FIG. 6 and FIG. 7, the third leaf springs 30 are curved so that their circumferential centers are positioned below both edges and so that they gradually move upward and outward from the inside of the clamp 3 lengthwise with respect to the pipe to match the slope of the third leaf spring receiving grooves 21.

A fastener 1 with the body 2 and the clamp 3 in this configuration, as shown in FIG. 10 through FIG. 17, is assembled so that the clamp 3 is received and held by the clamp holder 10 in the body 2. In the assembly operation, the clamp 3 is pushed into the clamp holder 10, and the pair of second leaf springs with anti-release pawls 29 formed in the bottom 25 of the clamp 3 simply engages the pair of anti-release protrusions 18 formed on the bottom 15 of the clamp holder 10. When the second leaf springs with anti-release pawls 29 ride up over the anti-release protrusions 18, the tips 29 of the second leaf springs with anti-release pawls 29 engage the curved surfaces of the second leaf spring receiving grooves 18A, the clamp 3 is connected to the clamp holder 10, and the clamp is kept from being released. When connected, the pair of second leaf springs with anti-release pawls 29 resiliently engages the second leaf spring receiving grooves 18A in the pair of anti-release protrusions 18. The four first leaf springs 17 (with protrusions 17A) on the clamp holder 10 also resiliently engage the four first leaf spring receiving grooves 27 in the clamp 3. In addition, the pair of third leaf springs 30 formed on the bottom 25 of the clamp 3 resiliently engages the pair of third leaf spring receiving grooves 21 formed on the bottom 15 of the clamp holder 10. The resilient engagement of the first leaf springs 17 with the first leaf spring receiving grooves 27, the resilient engagement of the second leaf springs with anti-release pawls 29 with the second leaf spring receiving grooves 18A on the anti-release protrusions 18, and the resilient engagement of the third leaf springs 30 with the third leaf spring receiving grooves 21 allow the clamp 3 to be received and held by the clamp holder 10 while maintaining a constant gap. Because the engagement portions form a point or short line, the clamp 3 has a small contact area with the clamp holder 10. As a result, hardly any vibrations are transmitted between the clamp 3 and the clamp holder 10. Also, the resilient engagement of the first leaf springs 17 with the first leaf spring receiving grooves 27, the resilient engagement of the second leaf springs with anti-release pawls 29 with the second leaf spring receiving grooves 18A on the anti-release protrusions 18, and the resilient engagement of the third leaf springs 30 with the third leaf spring receiving grooves 21 change the resiliency of the respective leaf springs along the slope of the first leaf spring receiving grooves 27, the slope of the curved surface of the second leaf spring receiving grooves 18A, and the slope of the third leaf spring receiving grooves 21. As a result, the transmission of vibrations from the clamp 3 to the clamp holder 10 can be prevented or reduced in the gap between the clamp holder 10 and the clamp 3.

The first assembly consists of first leaf springs 17 on the clamp holder 10 and first leaf spring receiving grooves 27 formed in the clamp 3, the second assembly consists of second leaf springs with anti-release pawls 29 formed on the bottom 25 of the clamp 3 and second leaf spring receiving grooves 18A formed in the clamp holder 10, and the third assembly consists of third leaf springs 30 formed on the bottom 25 of the clamp 3 and third leaf spring receiving grooves 21 formed in the bottom 15 of the clamp holder 10. In the case of the first assembly, the resiliency of the first leaf spring 17 holds the clamp 3 received and held by the clamp holder 10 at a set interval from the body 2. This can reduce or absorb within the gap the force of the clamp 3 moving parallel to the side walls 14 (force moving in the left and right directions), can reduce or absorb within the gap force from the clamp 3 moving around the axis of the pipe (force in the rotational direction), and can reduce or absorb within the gap force moving up or down along with the first leaf spring receiving grooves 27. In the case of the second assembly, the tips of the second leaf springs with anti-release pawls 29 resiliently engage the second leaf spring receiving grooves 18A and the resiliency of the spring action absorbs within the gap the force of the clamp 3 moving parallel to the side walls 14, absorbs within the gap force from the clamp 3 moving around the axis of the pipe, and blocks or reduces the transmission of vibrations from the pipe (or the body panel to which the body is secured) between the clamp holder 10 and the clamp 3. In the case of the third assembly, the resiliency of the spring is reduced when the third leaf springs 30 are in the middle of the third leaf spring receiving grooves 21 and is increased when outside of the middle. This absorbs within the gap force from the clamp moving around the axis of the pipe in the front views of FIG. 3 and FIG. 7 and blocks or reduces the transmission of vibrations from the pipe (or the body panel to which the body is secured) between the clamp holder 10 and the clamp 3.

FIG. 18 shows the fastener 1 used to attach a pipe 5 serving as the elongated component (as well as pipes AA, BB, CC) to a body panel 6 serving as the attachment component. In this figure, a pipe 5 serves as the elongated component but another elongated component such as a wire harness can also be used. The pipe 5 is pushed into the clamp 3 from the open end 22 (FIG. 7) where it is received and held in place by the resilient holding plate 26. A stud 7 standing erect on the body panel 6 is pushed into the securing portion 9 of the body 2 from the opening 13, the stud engaging pawls 11 engage the threaded grooves or circumferential grooves on the stud 7, and the pipe 5 is secured to the body panel 6.

In this fastener 1, as explained above, the first leaf springs 17 resiliently engage the first leaf spring receiving grooves 27, the second leaf springs with anti-release pawls 29 resiliently engage the second leaf spring receiving grooves 18A in the anti-release protrusions 18, and the third leaf springs 30 resiliently engage the third leaf spring receiving grooves 21 to receive and hold the clamp 3 in the clamp holder 10 while maintaining a constant gap. In other words, the clamp 3 is connected to the clamp holder 10 with some give if the engagement points between the first leaf springs 17, the second leaf springs with anti-release pawls 29 and the third leaf springs 30 are released. Also, because the slope in the first leaf spring receiving grooves 27, the slope in the curvature of the second leaf spring receiving grooves 18A and the slope in the third leaf spring receiving grooves 21 can change the resiliency of the leaf springs, the vibration of the clamp 3 is transmitted to the clamp holder 10 via the gap between the clamp holder 10 and the clamp 3, so the impact of the vibration is stopped, reduced or absorbed.

When the vibration of the clamp exceeds the range of the gap, the second leaf springs with anti-release pawls 29 engage the second leaf spring receiving grooves 18A in the anti-release protrusions 18, keeping the connection between the clamp 3 and the clamp holder 10 (this, the body 2) from coming apart.

Figure 19:
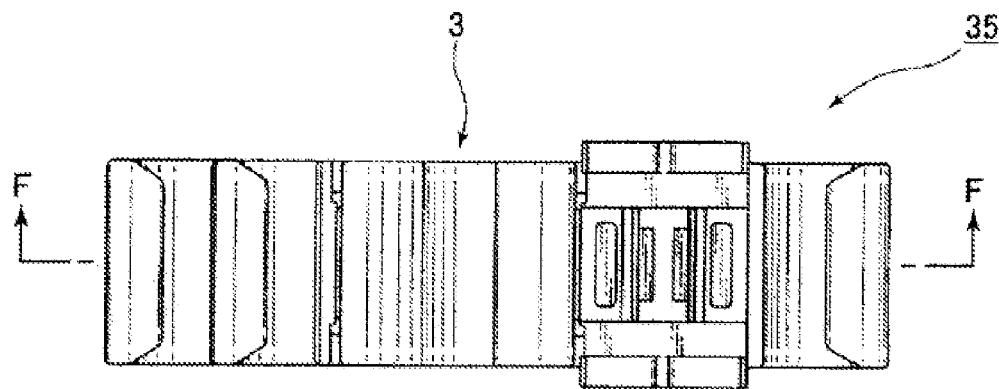
FIG. 19 is a front view of the fastener for an elongated component in the second embodiment of the present invention.
Figure 20:
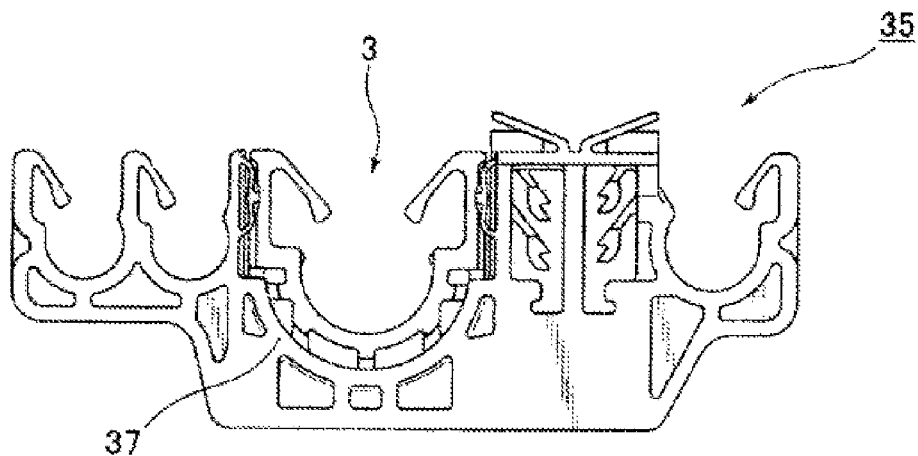
FIG. 20 is a front view of the fastener in FIG. 19.
Figure 21:
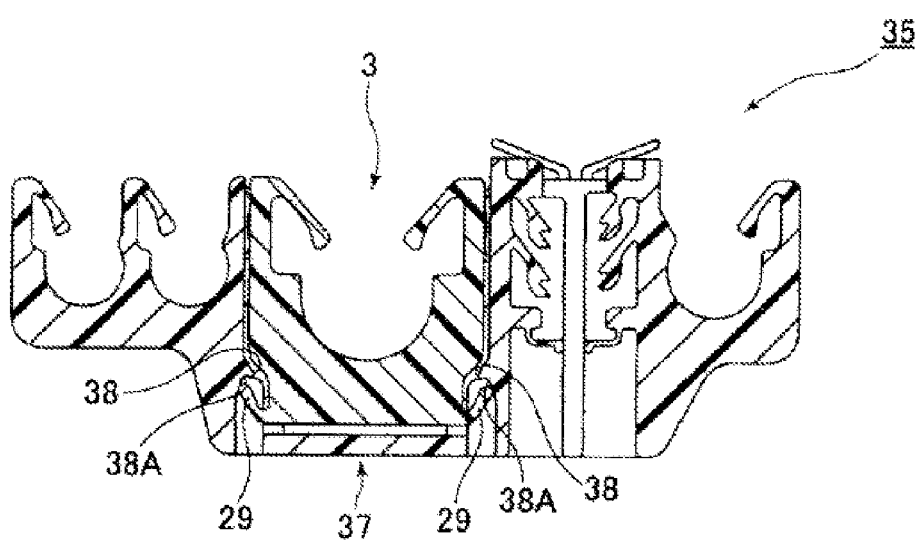
FIG. 21 is a cross-sectional view of the fastener from F-F in FIG. 19.

FIG. 19 through FIG. 21 show the fastener 35 in the second embodiment of the present invention. In this fastener 35, the shape of the second leaf spring receiving grooves 38A in the anti-release protrusions 38 of the clamp holder 37 engaging the second leaf springs with anti-release pawls 29 is different from the shape of the second leaf spring receiving grooves 18A in the anti-release protrusions 18 of the clamp holder 10 in the first embodiment of fastener 1. The other portions have the same shape as the fastener 1 so further explanation of these portions has been omitted.

As shown in FIG. 21, the shape of the curvature of the second leaf spring receiving grooves 38A is different from the shape of the second leaf spring receiving grooves 18A. In the second leaf spring receiving grooves 38A, if the surface engaging the tips of the second leaf springs with anti-release pawls 29 is subjected to upward moving force from the pipe on the clamp 3 (force moving the pipe out of the clamp 3), the shape increases the amount of deflection in the second leaf springs (with anti-release pawls) 29. The shape of the curvature of the second leaf spring receiving grooves 38A strengthens the restraint on upward movement of the clamp 3 out of the clamp holder 10, and reduces or absorbs the upward vibrations of the clamp 3 in the clamp holder 10.

It will be appreciated by persons skilled in the art that the above embodiments have been described by way of example only, and not in any limitative sense, and that various alterations and modifications are possible without departure from the scope of the invention as defined by the appended claims.

What is claimed is:

1. A fastener for holding an elongated component to an attachment component, the fastener comprising:
 a one-piece, unitary body secured to the attachment component;
 a clamp for holding the elongated component; and
 wherein the elongated component is attached to the attachment component by holding the elongated component in the clamp and by securing the body to the attachment component,
 wherein the clamp is formed as a separate component from the body,
 wherein the clamp is a one-piece, unitary structure,
 wherein the body includes a securing portion fixable to the attachment component and a clamp holder for receiving and holding the clamp,
 wherein the clamp is formed in a U-shape with a first side wall, a second side wall, and a first bottom wall for receiving the elongated component pushed in from the open end, and a resilient holding plate extending from each side wall towards the bottom wall to hold the elongated component received in the open end in the clamp,
 wherein the clamp holder in the body is formed from a third side wall, a fourth side wall and a second bottom wall defining a space with an open end for receiving the clamp while maintaining a gap between the clamp and the body in which the clamp is able to vibrate with respect to the clamp holder,
 wherein a first leaf spring is formed on the third side wall of the clamp holder to resiliently press against the first side wall of the clamp so as to maintain the gap between the first side wall of the clamp and the third side wall of the clamp holder when the clamp has been received by the clamp holder,
 wherein a second leaf spring is formed on the bottom of the clamp,
 wherein an anti-release protrusion is formed on one of said third and fourth side walls of said clamp holder proximate the bottom of the clamp holder to connect the clamp to the clamp holder when the clamp has been pushed into the clamp holder,
 wherein the second leaf spring formed on the bottom of said clamp defines an anti-release pawl,
 wherein the anti-release protrusion formed on said one of said third and fourth side walls of said clamp holder partly defining a second leaf spring receiving groove;
 wherein, when the clamp has been inserted into the clamp holder, the second leaf spring anti-release pawl formed on the bottom of the clamp directly engages the anti-release protrusion formed proximate the bottom of the clamp holder to retain the clamp in the clamp holder; and
 wherein the second leaf spring presses against the body so as to maintain the gap between the bottom of the clamp and the bottom of the clamp holder allowing the clamp to vibrate with respect to the clamp holder.

2. The fastener of claim 1, wherein a first leaf spring receiving groove is formed in the first side wall of the clamp to resiliently engage the first leaf spring, and the first leaf spring receiving groove is formed so as to include a deep point in the middle and shallower portions at both ends, and a protrusion is formed in the middle of the first leaf spring to make contact with the deep point of the first leaf spring receiving groove.

3. The fastener of claim 2, wherein the first leaf spring extends lengthwise from the open end of the clamp holder to the bottom of the third side wall, and wherein first leaf spring receiving grooves are formed in the clamp at positions corresponding to the first leaf springs.

4. A fastener for holding an elongated component to an attachment component, the fastener comprising:
 a body secured to the attachment component;
 a clamp for holding the elongated component; and
 wherein the elongated component is attached to the attachment component by holding the elongated component in the clamp and by securing the body to the attachment component,
 wherein the clamp is formed as a separate component from the body,
 wherein the body includes a securing portion fixable to the attachment component and a clamp holder for receiving and holding the clamp,
 wherein the clamp is formed in a U-shape with a first side wall, a second side wall, and a first bottom wall for receiving the elongated component pushed in from the open end, and a resilient holding plate extending from each side wall towards the bottom wall to hold the elongated component received in the open end in the clamp,
 wherein the clamp holder in the body is formed from a third side wall, a fourth side wall and a second bottom wall defining a space with an open end for receiving the clamp while maintaining a gap between the clamp and the body in which the clamp is able to vibrate with respect to the clamp holder,
 wherein a first leaf spring is formed on the third side wall of the clamp holder to resiliently press against the first side wall of the clamp so as to maintain the gap between the first side wall of the clamp and the third side wall of the clamp holder when the clamp has been received by the clamp holder, wherein a first leaf spring receiving groove is formed in the first side wall of the clamp to resiliently engage the first leaf spring, and the first leaf spring receiving groove is formed so as to include a deep point in the middle and shallower portions at both ends, and a protrusion is formed in the middle of the first leaf spring to make contact with the deep point of the first leaf spring receiving groove, wherein the first leaf spring extends lengthwise from the open end of the clamp holder to the bottom of the third side wall, and wherein first leaf spring receiving grooves are formed in the clamp at positions corresponding to the first leaf springs, wherein a second leaf spring is located proximate the bottom of the clamp, wherein an anti-release protrusion is located on one of said third and fourth side walls of said clamp holder proximate the bottom of the clamp holder to connect the clamp to the clamp holder when the clamp has been pushed into the clamp holder, wherein the second leaf spring located proximate the bottom of said clamp defines an anti-release pawl, wherein the anti-release protrusion located on one of said third and fourth side walls of said clamp holder partly defining a second leaf spring receiving groove;

wherein, when the clamp has been inserted into the clamp holder, the second leaf spring anti-release pawl located proximate the bottom of said clamp engages the anti-release protrusion located on the clamp holder to retain the clamp in the clamp holder;

wherein the second leaf spring presses against the body so as to maintain the gap between the bottom of the clamp and the bottom of the clamp holder allowing the clamp to vibrate with respect to the clamp holder; and wherein a third leaf spring is formed in the bottom of the clamp at a position other than the second leaf spring, wherein a third leaf spring receiving groove is formed in the bottom of the clamp holder to resiliently engage the third leaf spring, wherein the third leaf spring receiving groove is formed with a curved shape to receive the third leaf spring, wherein the curved shape is sloped so as to be deep in the middle and to become gradually shallower at both ends circumferentially and sloped so as to be deep in the inside and to become gradually shallower on the outside lengthwise with respect to the elongated component, the resiliency being smaller when the third leaf spring is along the middle of the third leaf spring receiving groove and the resiliency being larger when the third leaf spring is outside of the middle of the third leaf spring receiving groove, and wherein movement is allowed so as to reduce or absorb the vibration in the gap when the clamp vibrates in the clamp holder.

5. The fastener of claim 4, wherein the shape of the second leaf spring receiving grooves is curved to increase the deflection of the second leaf springs defining anti-release pawls when the surface engaging the tips of the second leaf springs defining anti-release pawls are subjected to force moving the elongated component in the clamp out of the clamp in the release direction.

6. A fastener for holding an elongated component to an attachment component, the fastener comprising:

a body secured to the attachment component;

a clamp for holding the elongated component; and wherein the elongated component is attached to the attachment component by holding the elongated component in the clamp and by securing the body to the attachment component, wherein the clamp is formed as a separate component from the body, wherein the body includes a securing portion fixable to the attachment component and a clamp holder for receiving and holding the clamp, wherein the clamp is formed in a U-shape with a first side wall, a second side wall, and a first bottom wall for receiving the elongated component pushed in from the open end, and a resilient holding plate extending from each side wall towards the bottom wall to hold the elongated component received in the open end in the clamp, wherein the clamp holder in the body is formed from a third side wall, a fourth side wall and a second bottom wall defining a space with an open end for receiving the clamp while maintaining a gap between the clamp and the body in which the clamp is able to vibrate with respect to the clamp holder, wherein the entire fastener is formed of a hard material;

wherein a first leaf spring is located on the third side wall of the clamp holder to resiliently press against the first side wall of the clamp so as to maintain the gap between the first side wall of the clamp and the third side wall of the clamp holder when the clamp has been received by the clamp holder, wherein a second leaf spring is located on the bottom of the clamp, wherein an anti-release protrusion is located on one of said third and fourth side walls of said clamp holder proximate the bottom of the clamp holder to connect the clamp to the clamp holder when the clamp has been pushed into the clamp holder, wherein the second leaf spring defines an anti-release pawl, wherein the anti-release protrusion located on one of said third and fourth side walls of said clamp holder partly defining a second leaf spring receiving groove;

wherein, when the clamp has been inserted into the clamp holder, the second leaf spring anti-release pawl located on the bottom of said clamp directly engages the anti-release protrusion located proximate the bottom of the clamp holder to retain the clamp in the clamp holder; and wherein the second leaf spring presses against the body so as to maintain the gap between the bottom of the clamp and the bottom of the clamp holder allowing the clamp to vibrate with respect to the clamp holder.

7. The fastener of claim 6, wherein the fastener is formed of hard synthetic resin material.

8. A fastener for holding an elongated component to an attachment component, the fastener comprising:

a body secured to the attachment component;

a clamp for holding the elongated component; and wherein the elongated component is attached to the attachment component by holding the elongated component in the clamp and by securing the body to the attachment component, wherein the clamp is formed as a separate component from the body, wherein the body includes a securing portion fixable to the attachment component and a clamp holder for receiving and holding the clamp, wherein the clamp is formed in a U-shape with a first side wall, a second side wall, and a first bottom wall for receiving the elongated component pushed in from the open end, and a resilient holding plate extending from each side wall towards the bottom wall to hold the elongated component received in the open end in the clamp, wherein the clamp holder in the body is formed from a third side wall, a fourth side wall and a second bottom wall defining a space with an open end for receiving the clamp while maintaining a gap between the clamp and the body in which the clamp is able to vibrate with respect to the clamp holder, wherein the clamp and the clamp holder are formed of hard material, and the gap is devoid of resilient soft material;

wherein a first leaf spring is located on the third side wall of the clamp holder to resiliently press against the first side wall of the clamp so as to maintain the gap between the first side wall of the clamp and the third side wall of the clamp holder when the clamp has been received by the clamp holder, wherein a second leaf spring is located on the bottom of the clamp, wherein an anti-release protrusion is located on one of said third and fourth side walls of said clamp holder proximate the bottom of the clamp holder to connect the clamp to the clamp holder when the clamp has been pushed into the clamp holder, wherein the second leaf spring defines an anti-release pawl, wherein the anti-release protrusion located on one of said third and fourth side walls of said clamp holder partly defining a second leaf spring receiving groove;

wherein, when the clamp has been inserted into the clamp holder, the second leaf spring anti-release pawl located on the bottom of said clamp directly engages the anti-release protrusion located proximate the bottom of the clamp holder to retain the clamp in the clamp holder; and wherein the second leaf spring presses against the body so as to maintain the gap between the bottom of the clamp and the bottom of the clamp holder allowing the clamp to vibrate with respect to the clamp holder.

9. A fastener for holding an elongated component to an attachment component, the fastener comprising:

a body secured to the attachment component;

a clamp for holding the elongated component; and wherein the elongated component is attached to the attachment component by holding the elongated component in the clamp and by securing the body to the attachment component, wherein the clamp is formed as a separate component from the body, wherein the body includes a securing portion fixable to the attachment component and a clamp holder for receiving and holding the clamp, wherein the clamp is formed in a U-shape with a first side wall, a second side wall, and a first bottom wall for receiving the elongated component pushed in from the open end, and a resilient holding plate extending from each side wall towards the bottom wall to hold the elongated component received in the open end in the clamp, wherein the clamp holder in the body is formed from a third side wall, a fourth side wall and a second bottom wall defining a space with an open end for receiving the clamp while maintaining a gap between the clamp and the body in which the clamp is able to vibrate with respect to the clamp holder, wherein a first leaf spring is located on the third side wall of the clamp holder to resiliently press against the first side wall of the clamp so as to maintain the gap between the first side wall of the clamp and the third side wall of the clamp holder when the clamp has been received by the clamp holder, wherein a second leaf spring is located on the bottom of the clamp, wherein an anti-release protrusion is located on one of said third and fourth side walls of said clamp holder proximate the bottom of the clamp holder to connect the clamp to the clamp holder when the clamp has been pushed into the clamp holder, wherein the second leaf spring defines an anti-release pawl, wherein the anti-release protrusion located on one of said third and fourth side walls of said clamp holder partly defining a second leaf spring receiving groove;

wherein, when the clamp has been inserted into the clamp holder, the second leaf spring anti-release pawl located on the bottom of said clamp directly engages the anti-release protrusion located proximate the bottom of the clamp holder to retain the clamp in the clamp holder;

wherein the second leaf spring presses against the body so as to maintain the gap between the bottom of the clamp and the bottom of the clamp holder allowing the clamp to vibrate with respect to the clamp holder;

such that transmission of vibrations is reduced or prevented within the gap without the use of resilient soft material in the gap.

* * * * *